United States Patent
Dobashi et al.

(10) Patent No.: US 12,404,037 B2
(45) Date of Patent: Sep. 2, 2025

(54) PASSENGER BOARDING BRIDGE

(71) Applicant: SHINMAYWA INDUSTRIES, LTD., Takarazuka (JP)

(72) Inventors: Hideaki Dobashi, Takarazuka (JP); Takashi Kunitake, Takarazuka (JP)

(73) Assignee: SHINMAYWA INDUSTRIES, LTD., Hyogo (JP)

( * ) Notice: Subject to any disclaimer, the term of this patent is extended or adjusted under 35 U.S.C. 154(b) by 628 days.

(21) Appl. No.: 17/906,139

(22) PCT Filed: Mar. 30, 2020

(86) PCT No.: PCT/JP2020/014473
§ 371 (c)(1),
(2) Date: Sep. 12, 2022

(87) PCT Pub. No.: WO2021/199117
PCT Pub. Date: Oct. 7, 2021

(65) Prior Publication Data
US 2023/0109013 A1  Apr. 6, 2023

(51) Int. Cl.
*B64F 1/30* (2006.01)
*B64F 1/305* (2006.01)

(52) U.S. Cl.
CPC .................... *B64F 1/305* (2013.01)

(58) Field of Classification Search
CPC .................... B64F 1/305; B64F 1/3055
See application file for complete search history.

(56) References Cited

U.S. PATENT DOCUMENTS

| | | | | |
|---|---|---|---|---|
| 3,683,440 | A | * | 8/1972 | Xenakis ............... B64F 1/3055 14/71.5 |
| 5,855,035 | A | * | 1/1999 | Streeter ................ B64F 1/305 14/72.5 |
| 2003/0208861 | A1 | * | 11/2003 | Hutton ................ B64F 1/3055 14/71.5 |

(Continued)

FOREIGN PATENT DOCUMENTS

| | | |
|---|---|---|
| JP | 4306937 B2 | 8/2009 |
| JP | 2019043535 A * | 3/2019 |

(Continued)

*Primary Examiner* — Abigail A Risic
(74) *Attorney, Agent, or Firm* — Alleman Hall & Tuttle LLP

(57) ABSTRACT

A passenger boarding bridge is capable of avoiding docking by backward travel of travel wheels. The passenger boarding bridge includes: a rotunda connected to a terminal building and supported to be rotatable horizontally; a tunnel unit, whose proximal end is connected to the rotunda, that is extendable and retractable; a cab provided at a distal end of the tunnel unit and configured to be docked with an aircraft; travel wheels supporting the tunnel unit and configured to travel forward and backward in changeable directions; an operating device that is operated to input an operation command to the travel wheels; and a determiner configured to repeatedly perform determination whether or not the current direction of the forward travel of the travel wheels is within a predetermined range during a period from when the cab starts being moved from a predetermined position until the cab is docked with the aircraft.

10 Claims, 7 Drawing Sheets

(56) References Cited

U.S. PATENT DOCUMENTS

| | | | |
|---|---|---|---|
| 2005/0198750 A1* | 9/2005 | Spencer | B64F 1/3055 14/71.5 |
| 2007/0210952 A1* | 9/2007 | Hutton | G08G 5/51 342/23 |
| 2008/0098537 A1* | 5/2008 | Hutton | B64F 1/305 14/71.5 |
| 2008/0098538 A1* | 5/2008 | Hutton | B64F 1/3055 14/71.5 |
| 2020/0165009 A1* | 5/2020 | Sonoda | B64F 1/305 |
| 2022/0144453 A1* | 5/2022 | Wada | B64F 1/3055 |
| 2023/0202683 A1* | 6/2023 | Shimomori | B64F 1/305 14/71.1 |

FOREIGN PATENT DOCUMENTS

| | | | | |
|---|---|---|---|---|
| WO | WO-2019012648 A1 * | 1/2019 | | B64F 1/305 |
| WO | WO-2020002405 A1 * | 1/2020 | | B64F 1/3055 |

\* cited by examiner

PASSENGER BOARDING BRIDGE

TECHNICAL FIELD

The present invention relates to a passenger boarding bridge.

BACKGROUND ART

At an airport, a passenger boarding bridge that connects between a terminal building and an aircraft is often used for boarding onto and disembarking from the aircraft (see Patent Literature 1, for example).

Patent Literature 1 discloses that an operator operates a passenger boarding bridge by operating operation switches and an operating lever that are provided on an operating device (a control panel).

For example, the passenger boarding bridge includes: a rotunda connected to an entrance of a terminal building and supported in a horizontally rotatable manner; a tunnel unit whose proximal end is connected to the rotunda, the tunnel unit including a plurality of tunnels that are fitted together in a telescopic manner, such that the tunnel unit is extendable and retractable; a cab rotatably provided at the distal end of the tunnel unit and docked with an entrance (door) of an aircraft; and drive columns provided at the distal side of the tunnel unit, the drive columns serving as support legs. The drive columns include a lifting/lowering device and a travel device. The lifting/lowering device moves the tunnel unit upward/downward. The travel device is provided below the lifting/lowering device. The travel device includes a pair of travel wheels, each of which can be independently driven to rotate in regular and reverse directions. The travel device is configured to travel forward, travel backward, and change the travel direction, by the driving of the travel wheels.

CITATION LIST

Patent Literature

PTL 1: Japanese Patent No. 4306937

SUMMARY OF INVENTION

Technical Problem

Currently, it is often the case that docking the passenger boarding bridge configured as above with an aircraft, and undocking the passenger boarding bridge from the aircraft, are manually controlled through operations of an operating device by an operator. Usually, in the case of docking the passenger boarding bridge with the aircraft, the operator performs operations to cause the travel wheels to travel forward, thereby docking the distal-end cab of the passenger boarding bridge with the door of the aircraft. Then, in the case of undocking the passenger boarding bridge from the aircraft, the operator performs operations to cause the travel wheels to travel backward, thereby undocking and returning the passenger boarding bridge to a predetermined standby position.

In the above cases where the docking and undocking are controlled through operations performed by the operator, the docked state of the passenger boarding bridge with the aircraft depends on the skill of the operator. Some operator may dock the cab with the aircraft by backward travel of the travel wheels. In such a case, in order to undock the passenger boarding bridge from the aircraft, the operator needs to cause the travel wheels to travel forward. However, there may be a case where the undocking operation is performed by a different operator from an operator having performed the previous docking operation. In such a case, at the time of undocking, if the operator is unaware of the current state (i.e., current docked state), there is a risk that the operator causes the travel wheels to travel backward as he or she would do so in normal undocking, and as a result, the undocking from the aircraft is hindered.

Also, there may be a case where the distal end of the cab is provided with a limit switch that detects docking of the cab with an aircraft, and when the limit switch has detected that the cab has been docked with the aircraft, forward travel of the travel wheels is prohibited. In such a case, if an operator has docked the cab with the aircraft by backward travel of the travel wheels, then the travel wheels cannot be caused to travel forward. That is, the cab cannot be undocked from the aircraft through operations of the operating device by the operator.

The present invention has been made to solve the above-described problems. An object of the present invention is to provide a passenger boarding bridge capable of avoiding a situation where a cab thereof is docked with an aircraft by backward travel of travel wheels.

Solution to Problem

In order to achieve the above object, a passenger boarding bridge according to one aspect of the present invention includes: a rotunda connected to a terminal building and supported such that the rotunda is rotatable horizontally; a tunnel unit whose proximal end is connected to the rotunda, the tunnel unit being extendable and retractable; a cab provided at a distal end of the tunnel unit, the cab being configured to be docked with an aircraft; a travel device that supports the tunnel unit and includes travel wheels configured to travel forward and backward, the travel device being configured such that a direction of forward travel of the travel wheels and a direction of backward travel of the travel wheels are changeable; an operating device that is operated to input an operation command to the travel device; and a determiner configured to repeatedly perform determination whether or not the current direction of the forward travel of the travel wheels is a direction within a forward-only travel docking enabling range during a period from when the cab starts being moved from a predetermined position until the cab is docked with the aircraft, the cab being moved through an operation of the operating device to cause the travel wheels to travel.

According to the above configuration, during a period from when the cab starts being moved from the predetermined position until the cab is docked with the aircraft, the determiner repeatedly performs the determination whether or not the current direction of the forward travel of the travel wheels is a direction within the forward-only travel docking enabling range. In a case where a result of the determination indicates that the current direction of the forward travel of the travel wheels is not a direction within the forward-only travel docking enabling range, docking of the cab with the aircraft by backward travel of the travel wheels can be avoided by, for example, giving a warning to an operator and/or restricting the backward travel of the travel wheels.

In a case where, in a plan view, an angle formed by a direction from a left side to a right side of the tunnel unit along a tunnel orthogonal line and the direction of the forward travel of the travel wheels, the tunnel orthogonal line being a straight line orthogonal to a center line of the tunnel unit, the angle being calculated with respect to the tunnel orthogonal line while defining a counterclockwise direction as a positive direction, is an angle θw, and in the plan view, an angle formed by the direction from the left side to the right side of the tunnel unit along the tunnel orthogonal line and a direction from a front to a back of the aircraft along a fuselage guide line on an apron, the angle being calculated with respect to the tunnel orthogonal line while defining the counterclockwise direction as the positive direction, is an angle θt, the determiner may be configured to perform the determination whether or not the direction of the forward travel of the travel wheels is a direction within the forward-only travel docking enabling range based on whether or not the angle θw is an angle within a range that is set, based on restricting condition information, within a range that is greater than the angle θt and less than an angle obtained by adding 180 degrees to the angle θt.

In the present specification and the claims, when an angle formed by a direction A and a direction B is referred to, this angle corresponds to an angle formed by a directional vector indicating the direction A and a directional vector indicating the direction B. For example, the above "angle formed by a direction from a left side to a right side of the tunnel unit along a tunnel orthogonal line and the direction of the forward travel of the travel wheels" corresponds to an "angle formed by a directional vector indicating the direction from the left side to the right side of the tunnel unit along the tunnel orthogonal line and a directional vector indicating the direction of the forward travel of the travel wheels".

In a case where, in a plan view, an angle formed by a direction from a left side to a right side of the tunnel unit along a tunnel orthogonal line and the direction of the forward travel of the travel wheels, the tunnel orthogonal line being a straight line orthogonal to a center line of the tunnel unit, the angle being calculated with respect to the tunnel orthogonal line while defining a counterclockwise direction as a positive direction, is an angle θw, and in the plan view, an angle formed by the direction from the left side to the right side of the tunnel unit along the tunnel orthogonal line and a direction from a front to a back of the aircraft along an aircraft axis line of the aircraft, the angle being calculated with respect to the tunnel orthogonal line while defining the counterclockwise direction as the positive direction, is an angle θt1, the determiner may be configured to perform the determination whether or not the direction of the forward travel of the travel wheels is a direction within the forward-only travel docking enabling range based on whether or not the angle θw is an angle within a range that is set, based on restricting condition information, within a range that is greater than the angle θt1 and less than an angle obtained by adding 180 degrees to the angle θt1.

In a case where, in a plan view, an angle formed by a direction from a left side to a right side of the tunnel unit along a tunnel orthogonal line and the direction of the forward travel of the travel wheels, the tunnel orthogonal line being a straight line orthogonal to a center line of the tunnel unit, the angle being calculated with respect to the tunnel orthogonal line while defining a counterclockwise direction as a positive direction, is an angle θw, and in the plan view, an angle formed by the direction from the left side to the right side of the tunnel unit along the tunnel orthogonal line and a direction from a front to a back of the aircraft along a tangent line, the tangent line extending horizontally and touching a cab-docked part of the aircraft, the angle being calculated with respect to the tunnel orthogonal line while defining the counterclockwise direction as the positive direction, is an angle θt2, the determiner may be configured to perform the determination whether or not the direction of the forward travel of the travel wheels is a direction within the forward-only travel docking enabling range based on whether or not the angle θw is an angle within a range that is set, based on restricting condition information, within a range that is greater than the angle θt2 and less than an angle obtained by adding 180 degrees to the angle θt2.

A direction within the forward-only travel docking enabling range may be defined as a direction in which when the travel wheels travel forward, in a plan view, the travel wheels come closer to one of a fuselage guide line on an apron, an aircraft axis line of the aircraft, or a tangent line extending horizontally and touching a cab-docked part of the aircraft.

The determiner may be configured to perform the determination when a distance between the cab and the aircraft is a predetermined distance or less.

The passenger boarding bridge may further include a warning unit configured to perform warning if an operation command to cause the travel device to travel backward is inputted from the operating device in a case where a result of the determination performed by the determiner indicates that the current direction of the forward travel of the travel wheels is not a direction within the forward-only travel docking enabling range.

According to the above configuration, in a case where the current direction of the forward travel of the travel wheels is not a direction within the forward-only travel docking enabling range, docking of the cab with the aircraft by backward travel of the travel wheels can be avoided, for example, by giving a warning by the warning unit to an operator regarding backward travel or backward docking.

The passenger boarding bridge may be configured to prohibit backward travel of the travel wheels if an operation command to cause the travel device to travel backward is inputted from the operating device in a case where a result of the determination performed by the determiner indicates that the current direction of the forward travel of the travel wheels is not a direction within the forward-only travel docking enabling range.

According to the above configuration, in a case where the current direction of the forward travel of the travel wheels is not a direction within the forward-only travel docking enabling range, even if an operation command to cause the travel device to travel backward is inputted from the operating device, backward travel of the travel wheels is prohibited, and thereby docking of the cab with the aircraft by backward travel of the travel wheels can be avoided.

The passenger boarding bridge may further include a controller configured to, in a case where a result of the determination performed by the determiner indicates that the current direction of the forward travel of the travel wheels is not a direction within the forward-only travel docking enabling range, control the travel device such that the direction of the forward travel of the travel wheels becomes a direction within the forward-only travel docking enabling range.

According to the above configuration, in a case where the current direction of the forward travel of the travel wheels is not a direction within the forward-only travel docking enabling range, the travel device is controlled such that the direction of the forward travel of the travel wheels becomes a direction within the forward-only travel docking enabling range, and thereby docking of the cab with the aircraft by backward travel of the travel wheels can be avoided.

The passenger boarding bridge may further include a controller configured to, if an operation command to cause the travel device to travel backward is inputted from the operating device in a case where a result of the determination performed by the determiner indicates that the current direction of the forward travel of the travel wheels is not a direction within the forward-only travel docking enabling range, control the travel device such that the direction of the forward travel of the travel wheels becomes a direction within the forward-only travel docking enabling range.

According to the above configuration, if an operation command to cause the travel device to travel backward is inputted from the operating device in a case where the current direction of the forward travel of the travel wheels is not a direction within the forward-only travel docking enabling range, the travel device is controlled such that the direction of the forward travel of the travel wheels becomes a direction within the forward-only travel docking enabling range, and thereby docking of the cab with the aircraft by backward travel of the travel wheels can be avoided.

Advantageous Effects of Invention

The present invention is configured as described above, and has an advantage of being able to provide a passenger boarding bridge capable of avoiding a situation where a cab thereof is docked with an aircraft by backward travel of travel wheels.

The above object, other objects, features, and advantages of the present invention will be made clear by the following detailed description of a preferred embodiment with reference to the accompanying drawings.

DESCRIPTION OF EMBODIMENTS

Figure 1:
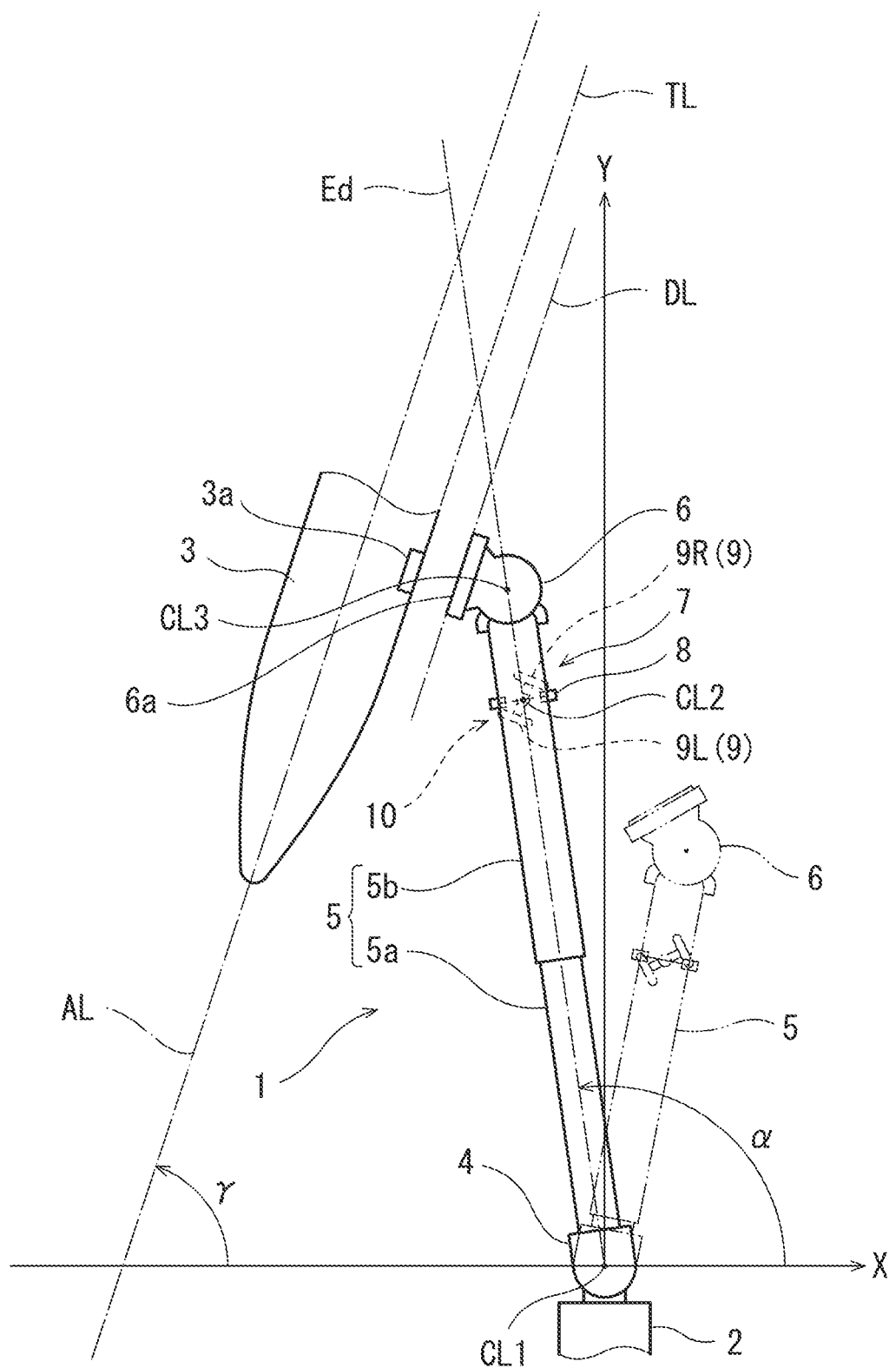
FIG. 1 is a schematic plan view showing one example of a passenger boarding bridge according to an embodiment of the present invention.

Hereinafter, a preferred embodiment of the present invention is described with reference to the drawings. In the drawings, the same or corresponding elements are denoted by the same reference signs, and repeating the same descriptions is avoided below. The present invention is not limited to the embodiment described below.

Embodiment

Figure 2:
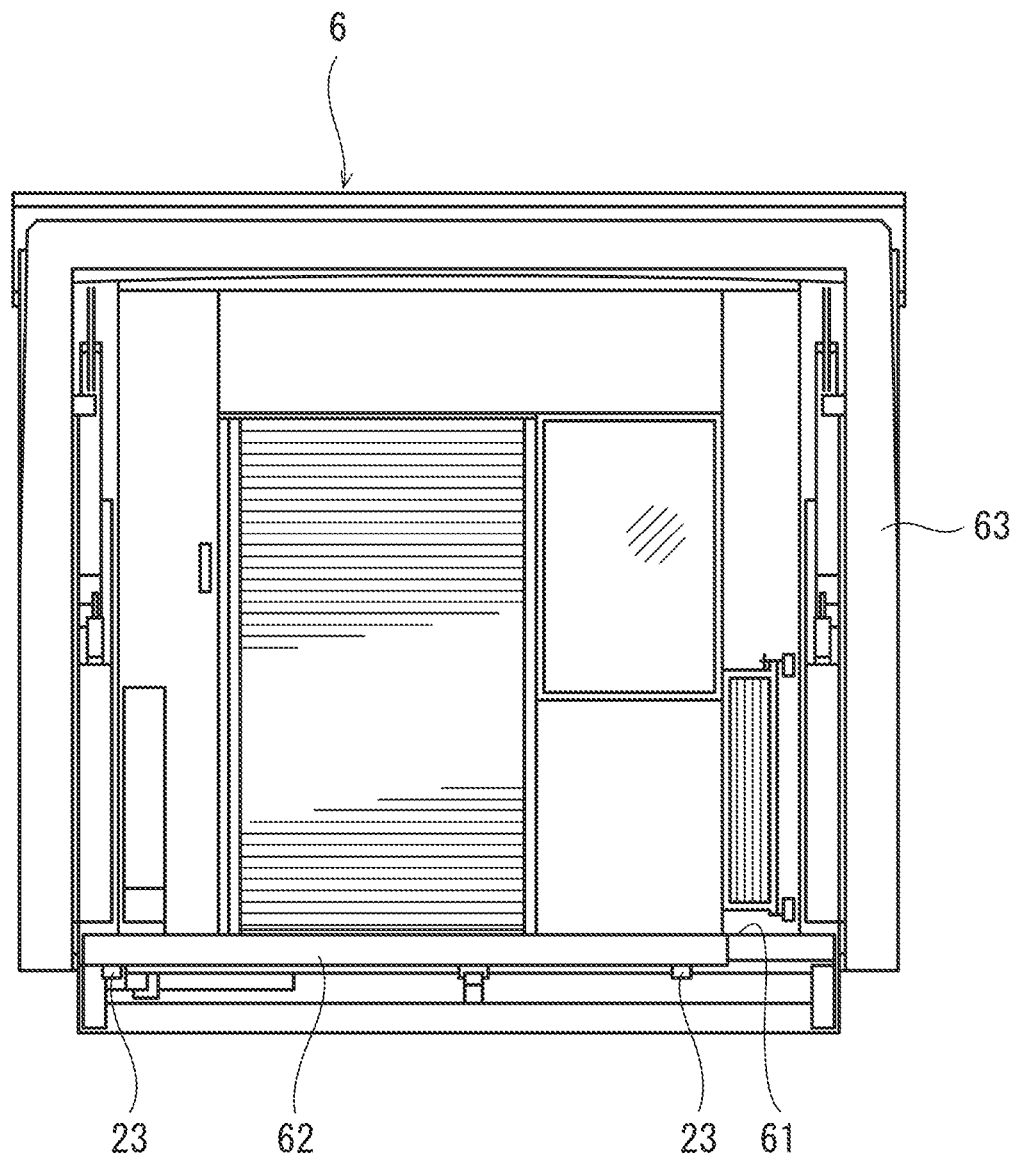
FIG. 2 is a front view of the distal end part of a cab to be docked with an aircraft.
Figure 3:
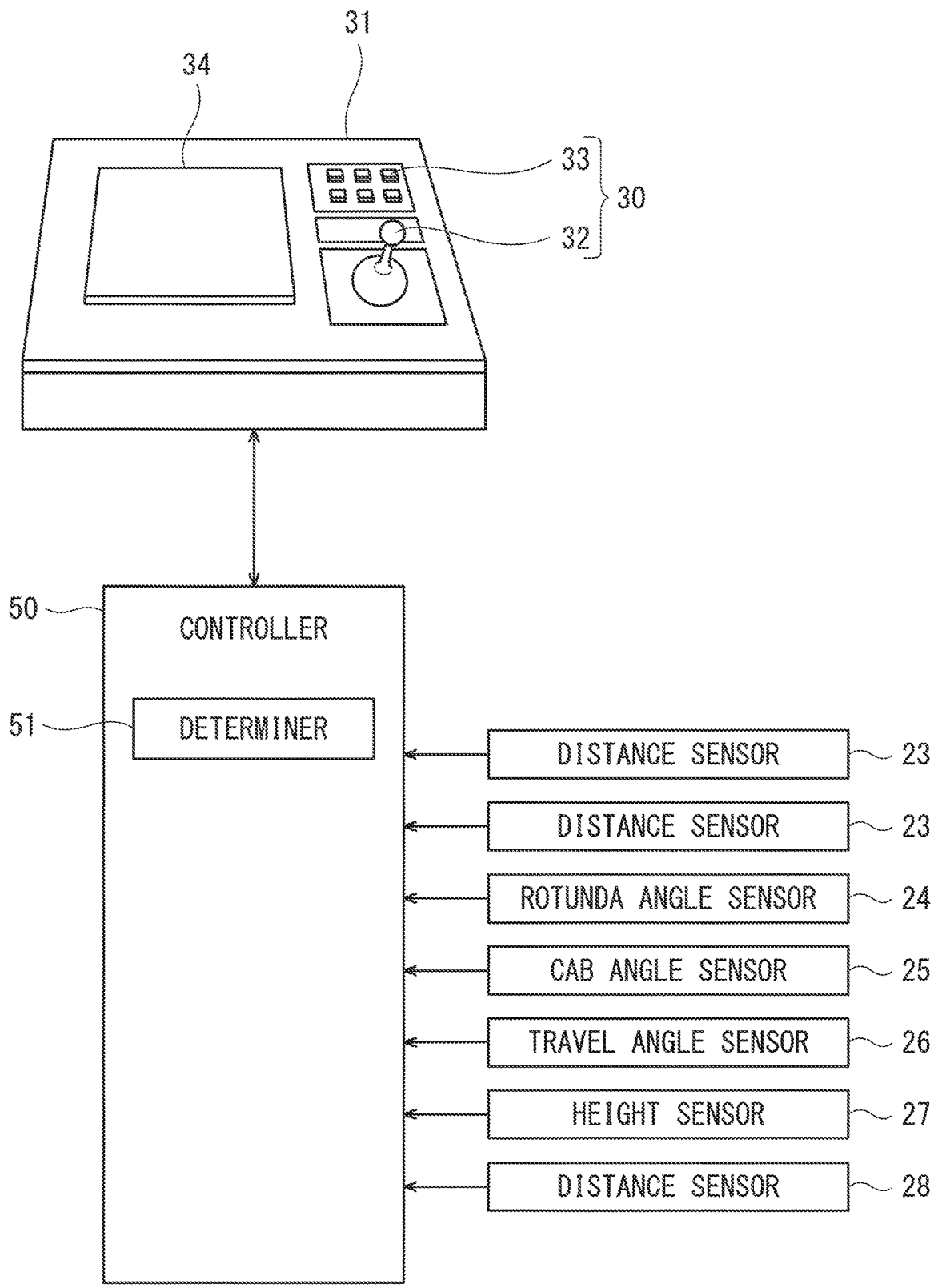
FIG. 3 shows one example of a control panel, etc.

FIG. 1 is a schematic plan view showing one example of a passenger boarding bridge according to the present embodiment. FIG. 2 is a front view of the distal end part of a cab to be docked with an aircraft (the front view is taken from the aircraft side). FIG. 3 shows one example of a control panel, etc.

A passenger boarding bridge 1 includes: a horizontally rotatable rotunda (proximal-end round room) 4 connected to an entrance of a terminal building 2 of an airport; a tunnel unit 5, whose proximal end is connected to the rotunda 4; and a cab (distal-end round room) 6 provided at the distal end of the tunnel unit 5, such that the cab 6 is rotatable in regular and reverse directions. It should be noted that, for example, auxiliary stairs (not shown) that an operator or the like on the ground uses to get in and out of the cab 6 are set on the side of the tunnel unit 5.

The rotunda 4 is supported by a support pillar, such that the rotunda 4 is rotatable in regular and reverse directions about a rotational axis (vertical axis) CL1. The tunnel unit 5 forms a passenger walkway, and includes a plurality of tubular tunnels 5a and 5b, which are fitted together in a telescopic manner (nested manner), such that the tunnel unit 5 is extendable and retractable in the longitudinal direction. In the description herein, the tunnel unit 5 includes the two tunnels 5a and 5b as one example. The number of tunnels included in the tunnel unit 5 is not particularly limited, so long as the tunnel unit 5 includes two or more tunnels. The proximal end part of the tunnel unit 5 is connected to the rotunda 4 in such a manner that the tunnel unit 5 is swingable vertically.

The distal side of the tunnel unit 5 (specifically, the tunnel 5b, which is the frontmost tunnel) is provided with drive columns 7, which serve as support legs. The drive columns 7 are provided with a lifting/lowering device 8, which moves the cab 6 and the tunnel unit 5 upward and downward (i.e., lifts and lowers the cab 6 and the tunnel unit 5). By moving the tunnel unit 5 upward/downward by the lifting/lowering device 8, the cab 6 and the tunnel unit 5 can be swung vertically with respect to the rotunda 4.

The drive columns 7 are further provided with a travel device 10 including a pair of travel wheels 9 (a right travel wheel 9R and a left travel wheel 9L), which are drivable to rotate independently of each other in regular and reverse directions. The travel device 10 is provided below the lifting/lowering device 8. The travel device 10 is configured to travel forward by regular rotation of the two travel wheels 9, and to travel backward by reverse rotation of the two travel wheels 9. The travel device 10 is also configured to be rotatable in regular and reverse directions about a rotational axis CL2, such that the rudder angle is changeable within the range of −90 degrees to +90 degrees with respect to the extension/retraction direction (longitudinal direction) of the tunnel unit 5, and thus the travel direction of the travel device 10 is changeable. For example, by causing the two travel wheels 9 to rotate in opposite directions to each other, the travel direction (the facing direction of the travel wheels 9) can be changed on the spot.

By causing the travel device 10 (the travel wheels 9) to travel on the apron, the tunnel unit 5 can be rotated about the rotunda 4 and can be extended/retracted. At the time, since the rudder angle of the travel device 10 is changeable within the range of −90 degrees to +90 degrees with respect to the longitudinal direction of the tunnel unit 5, the tunnel unit 5 can be extended only by causing the travel device 10 (the travel wheels 9) to travel forward, and the tunnel unit 5 can be retracted only by causing the travel device 10 (the travel wheels 9) to travel backward.

The cab 6 is provided at the distal end of the tunnel unit 5. The cab 6 is configured to be rotatable, by an unshown rotational mechanism, in regular and reverse directions about a rotational axis CL3, which is perpendicular to the floor surface of the cab 6.

As shown in FIG. 2, a bumper 62 is provided at the distal end of a floor 61 of the cab 6 to be docked with an aircraft 3. A plurality of (in this example, two) distance sensors 23 (e.g., laser distance meters), each of which detects the distance between the cab 6 and the aircraft 3, are mounted to the bumper 62, such that the distance sensors 23 are arranged in the left-right direction of the bumper 62.

As shown in FIG. 2, a closure 63 is provided at the distal end part of the cab 6. The closure 63 includes a bellows portion that is expandable and contractible in the front-back direction. By docking the cab 6 with the aircraft 3 and expanding the bellows portion forward, the front end of the bellows portion can be brought into contact with the aircraft 3 around the entrance (door 3a) thereof.

As shown in FIG. 3, the passenger boarding bridge 1 further includes: a rotunda angle sensor 24, which detects a rotational angle of the rotunda 4; a cab angle sensor 25, which detects a rotational angle of the cab 6 with respect to the tunnel unit 5; a travel angle sensor 26, which detects a rotational angle of the travel device 10 with respect to the tunnel unit 5 (an angle indicating the travel direction of the travel device 10); a height sensor 27, which measures the amount of lifting/lowering of the tunnel unit 5 by the lifting/lowering device 8 and detects the height of the tunnel unit 5; and a distance sensor 28, which detects a distance from the center point of the rotunda 4 (i.e., the position of the rotational axis CL1) to the center point of the cab 6 (i.e., the position of the rotational axis CL3) (this distance is hereinafter referred to as "distance R"). These sensors are arranged at suitable positions, respectively. The distance sensor 28 is configured as, for example, a distance meter that measures the length of the tunnel unit 5. The distance sensor 28 is capable of calculating the distance R from its measurement value, and also capable of calculating a distance from the center point of the rotunda 4 (the position of the rotational axis CL1) to the center point of the pair of travel wheels 9 (the position of the rotational axis CL2).

A control panel 31 as shown in FIG. 3 is provided inside the cab 6. The control panel 31 is provided with various operation switches 33 for performing operations of, for example, lifting/lowering the tunnel unit 5 and the cab 6 by the lifting/lowering device 8 and rotating the cab 6. The control panel 31 is further provided with: an operating lever 32 for operating the travel device 10; and a display device 34. The operating lever 32 is configured as a lever-shaped input device (i.e., a joystick) that has degrees of freedom multi-directionally. The operating lever 32 and the various operation switches 33 are included in an operating device 30. It should be noted that the configuration of the operating device 30 is modifiable as necessary.

A controller 50 and the control panel 31 are connected to each other via electrical circuitry. The controller 50 is configured to: receive inputs of information that is based on operations performed with the operating device 30, such as operation commands; receive inputs of, for example, output signals from the sensors 23 to 28; control the operations of the passenger boarding bridge 1; and output, for example, information to be displayed on the display device 34.

The controller 50 includes an arithmetic processing unit such as a CPU and a storage unit including a ROM, RAM, etc. A control program for operating the passenger boarding bridge 1 and information necessary for the operations of the passenger boarding bridge 1 are prestored in the storage unit. By executing the control program, the arithmetic processing unit functions as a controller that, for example, controls the operations of the components of the passenger boarding bridge 1 (the operations of, for example, the travel device 10, the lifting/lowering device 8, and the rotational mechanism of the cab 6), and also functions as, for example, a determiner 51 described below. It should be noted that information to be stored while the passenger boarding bridge 1 is in operation is also stored in the storage unit. The controller 50 may be configured as a single control device performing centralized control, or may be configured as a plurality of control devices performing distributed control in cooperation with each other via the Internet and LAN. For example, the cab 6 or the frontmost tunnel 5b is provided with the controller 50.

Next, one example of operations of the passenger boarding bridge 1 is described. Operations of the passenger boarding bridge 1 are realized by control performed by the controller 50.

Before the aircraft 3 arrives at the apron, the passenger boarding bridge 1 stands by at a predetermined standby position indicated by two-dot chain line of FIG. 1.

A regular stop position for the aircraft 3 is a predetermined position, at which the aircraft axis of the aircraft 3 is on a fuselage guide line AL, and the regular stop position is set in the extending direction of the fuselage guide line AL. The aircraft 3 is brought to a stop targeting the regular stop position. In FIG. 1, the aircraft 3 stops at the regular stop position, and the aircraft axis of the aircraft 3 is on the fuselage guide line AL, although, in reality, there are cases where an actual stop position of the aircraft 3 deviates from the regular stop position. It should be noted that the fuselage guide line AL is drawn on the apron.

Figure 4:
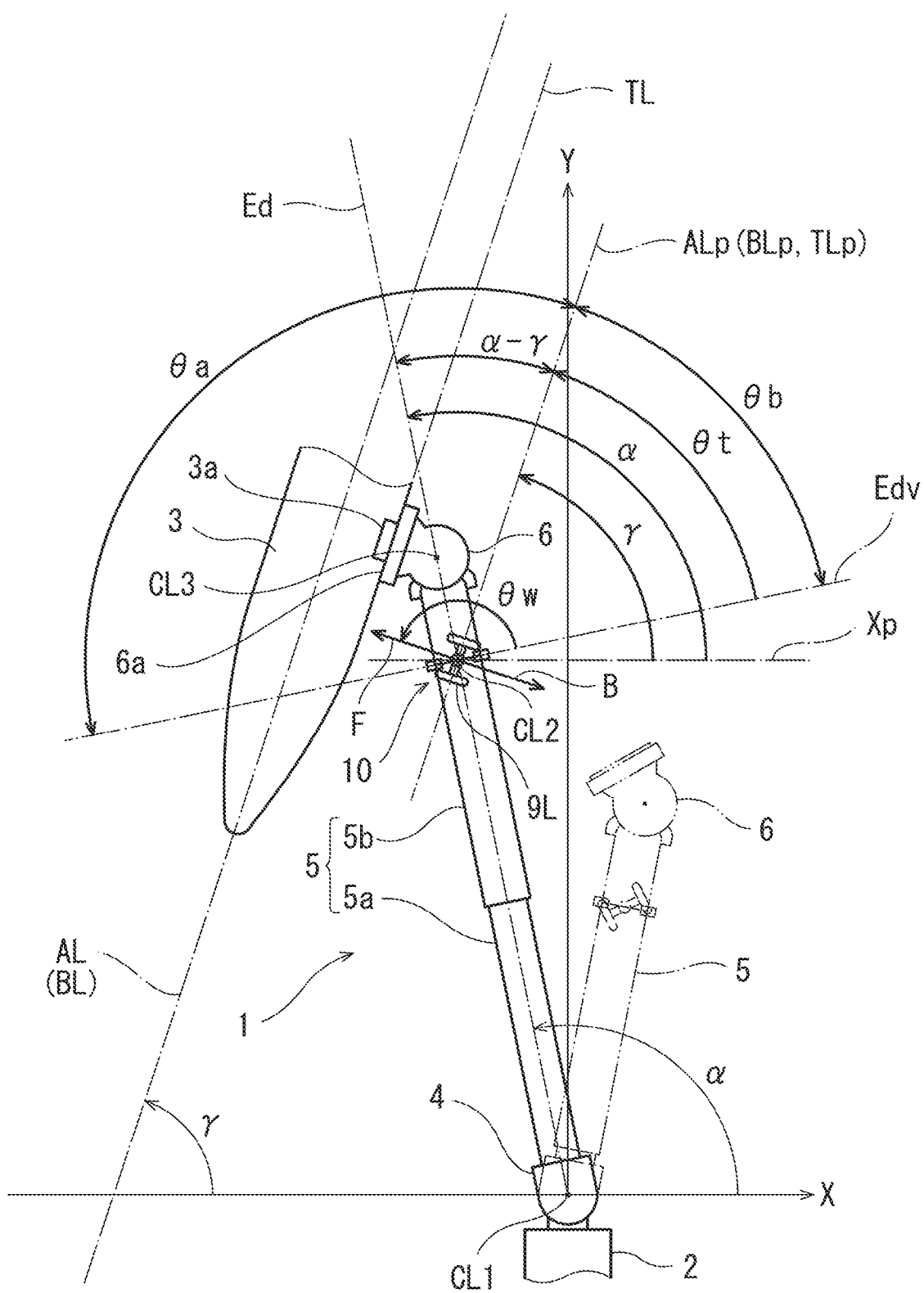
FIG. 4 is a schematic plan view showing one example where the passenger boarding bridge is in the state of being docked with the aircraft.

In the case of docking the passenger boarding bridge 1 with the aircraft 3, an operator in the cab 6 operates the operating device 30 (the operating lever 32 and various operation switches 33) of the control panel 31 to move the passenger boarding bridge 1 standing by at the standby position indicated by two-dot chain line in FIG. 1, thereby docking the cab 6 with the aircraft 3 (e.g., see FIG. 4 showing the docked state). At the time, the operator sets, as a target position, for example, a position that is forward from the door 3a, which is an entrance of the aircraft 3, by an arbitrary distance (e.g., about 1 m). Then, the operator causes the travel device 10 to travel forward such that the cab 6 reaches the target position, and operates the lifting/lowering device 8 and the rotational mechanism of the cab 6 such that, at the target position, the bumper 62 of the distal end part of the cab 6 faces the door 3a of the aircraft 3. The passenger boarding bridge 1 being in a state where the cab 6 is at the target position (i.e., the passenger boarding bridge 1 being at the target position) is indicated by solid line in FIG. 1.

Thereafter, the operator causes the travel device 10 to travel forward such that the cab 6 moves straight toward the door 3a, thereby docking the cab 6 with the aircraft 3. After docking the cab 6 with the aircraft 3, the operator operates the control panel 31 to expand the closure 63. This is merely one example of a general docking operation. Depending on, for example, the operator performing the docking, the docking of the cab 6 is not necessarily performed by the above-described manner.

When the cab 6 is in the state of being docked with the aircraft 3, the bumper 62 of the distal end part of the cab 6 may be in contact with the aircraft 3, or a slight gap that would not hinder walking between the cab 6 and the aircraft 3 may be formed between the bumper 62 and the aircraft 3.

Next, in the case of undocking the passenger boarding bridge 1 from the aircraft 3 and returning the passenger boarding bridge 1 to the standby position, after contracting the closure 63, the operator causes the travel device 10 to travel straight backward to undock the cab 6 from the door 3a, and keeps the travel device 10 traveling straight backward until the cab 6 comes into proximity to the aforementioned target position. Thereafter, the operator causes the travel device 10 to travel backward to bring the passenger boarding bridge 1 to the standby position.

It should be noted that controller 50 uses XY orthogonal coordinates as shown in FIG. 1 to recognize the position (coordinates) of each part of the passenger boarding bridge 1. In this example, the center point of the rotunda 4 (the position of the rotational axis CL1) is set as an origin (0, 0), and based thereon, an X-axis and a Y-axis are set as shown in FIG. 1. However, the X- and Y-axes can be set arbitrarily.

In the present embodiment, during a period from when the cab 6 starts being moved from the standby position until the cab 6 is docked with the aircraft 3, the controller 50 repeatedly performs a forward docking determination process to determine whether or not the forward travel direction (the direction of forward travel) of the travel device 10 (the travel wheels 9) is a direction within a forward-only travel docking enabling range (a function of the determiner 51). In a case where the forward travel direction of the travel wheels 9 is not a direction within the forward-only travel docking enabling range, the controller 50, for example, gives a warning to the operator and/or restricts backward travel of the travel wheels 9.

Hereinafter, the forward docking determination process performed by the determiner 51 is described further with reference to FIG. 4. FIG. 4 is a schematic plan view showing one example where the passenger boarding bridge 1 is in the state of being docked with the aircraft 3. FIG. 4 is a transparent view in which the travel device 10 is illustrated by solid line.

The passenger boarding bridge 1 indicated by solid line in FIG. 4 is in the state of being docked with the aircraft 3 by a basic docking operation (i.e., basic docked state). In the case of the basic docked state, the passenger boarding bridge 1 is docked with the aircraft 3 by forward travel, such that the travel direction of the travel wheels 9 (9L, 9R) is perpendicular to the fuselage guide line AL. In this case, in a plan view, the aircraft axis line BL (a straight line along the aircraft axis) of the aircraft 3 coincides with, or is parallel to, the fuselage guide line AL. Also, a tangent line TL touching a part of the aircraft 3, with which the cab 6 is docked (the part is specifically the door 3a and the vicinity thereof; hereinafter, this part is referred to as "the cab 6-docked part" of the aircraft 3), the tangent line TL extending horizontally along the surface of the cab 6-docked part, is parallel to the aircraft axis line BL of the aircraft 3. An arrow F indicates the forward travel direction of the travel wheels 9, and an arrow B indicates the backward travel direction of the travel wheels 9.

For the sake of convenience, FIG. 4 shows: a parallel line Xp, which passes through the center point (the rotational axis CL2) of the pair of travel wheels 9 and which is parallel to the X-axis; a parallel line ALp, which passes through the center point of the pair of travel wheels 9 and which is parallel to the fuselage guide line AL; a parallel line BLp, which passes through the center point of the pair of travel wheels 9 and which is parallel to the aircraft axis line BL; and a parallel line TLp, which passes through the center point of the pair of travel wheels 9 and which is parallel to the tangent line TL touching the cab 6-docked part of the aircraft 3. FIG. 4 also shows a straight line Edv, which passes through the center point of the pair of travel wheels 9 and which is orthogonal to a center line Ed of the tunnel unit 5. Hereinafter, the straight line Edv is referred to as "tunnel orthogonal line Edv".

Hereinafter, three examples of the forward docking determination process are described as first to third examples. It should be noted that, in the description below, for example, when an angle formed by a direction A and a direction B is referred to, this angle corresponds to an angle formed by a directional vector indicating the direction A and a directional vector indicating the direction B. Further, in a plan view referred to below (the view being seen from straight above), an angle $\theta w$, which is an angle formed by a direction from the left side to the right side of the tunnel unit 5 along the tunnel orthogonal line Edv and the forward travel direction of the travel wheels 9, the angle being calculated with respect to the tunnel orthogonal line Edv while defining a counterclockwise direction as a positive direction, is referred to as "forward travel direction angle $\theta w$". It should be noted that the left side and the right side of the tunnel unit 5 are defined based on the definition that the cab 6 side of the tunnel unit 5 as seen from straight above is the front side of the tunnel unit 5 and the rotunda 4 side of the tunnel unit 5 as seen from straight above is the back side of the tunnel unit 5.

Forward Docking Determination Process of First Example

In the forward docking determination process of the first example, the determiner 51 determines whether or not the forward travel direction F of the travel wheels 9 is a direction within the forward-only travel docking enabling range based on whether or not the forward travel direction angle $\theta w$ of the travel wheels 9 is an angle within a below-described angle range $\theta a$ in a plan view. In this case, a "direction within the forward-only travel docking enabling range" is a direction in which when the travel wheels 9 travel forward, in a plan view, the travel wheels 9 come closer to the fuselage guide line AL. The angle range $\theta a$ is, for example, a range that is wider than an angle $\theta t$. The angle $\theta t$ is formed by the fuselage guide line AL and calculated counterclockwise with respect to the tunnel orthogonal line Edv. It should be noted that, in the case of FIG. 4, the upper limit value of the angle range $\theta a$ is set to 180 degrees. In the description below, the angle $\theta t$ is also referred to as "determination reference angle $\theta t$".

Since the rudder angle of the travel device 10 (the travel wheels 9) is changeable within the range of −90 degrees to +90 degrees with respect to the longitudinal direction (the center line Ed) of the tunnel unit 5, the forward travel direction angle $\theta w$ of the travel wheels 9 may be an angle within the range of 0 to 180 degrees ($0 \leq \theta w \leq 180$). The forward travel direction angle $\theta w$ is obtained from a value detected by the travel angle sensor 26.

The determination reference angle $\theta t$, which is an angle formed by the tunnel orthogonal line Edv and the fuselage guide line AL (or the parallel line ALp), can be calculated by using an equation shown below.

$$\theta t = 90 - (\alpha - \gamma) = 90 - \alpha + \gamma$$

In the above equation, $\alpha$ is an angle that is formed by the center line Ed of the tunnel unit 5, calculated counterclockwise with respect to the X-axis, and obtained from a value detected by the rotunda angle sensor 24. Also, $\gamma$ is an angle that is formed by the fuselage guide line AL (or its extension line), calculated counterclockwise with respect to the X-axis, and prestored in the storage unit of the controller 50 as a predetermined value.

At the time of performing the forward docking determination process, the determiner 51 calculates the current determination reference angle $\theta t$, and if the current forward travel direction angle $\theta w$ is an angle within the angle range $\theta a$, which is a range set based on the current determination reference angle $\theta t$ and so forth, the determiner 51 determines that the forward travel direction F of the travel wheels 9 is a direction within the forward-only travel docking enabling range. A "direction within the forward-only travel docking enabling range" is a direction that extends straight within the angle range $\theta a$ from the center point of the travel wheels 9. In a case where the rudder angle of the travel device 10 is changeable within range of $-90$ degrees to $+90$ degrees with respect to the longitudinal direction of the tunnel unit 5 as in the present embodiment, the angle range $\theta a$ is greater than the determination reference angle $\theta t$ and not greater than 180 degrees.

On the other hand, in a case where the current forward travel direction angle $\theta w$ is an angle outside the angle range $\theta a$, the forward travel direction F of the travel wheels 9 is determined to be not a direction within the forward-only travel docking enabling range (i.e., determined to be a direction outside the forward-only travel docking enabling range). A "direction outside the forward-only travel docking enabling range" is a direction that extends straight within an angle range $\theta b$ from the center point of the travel wheels 9. The angle range $\theta b$ is not less than 0 degrees and not greater than the determination reference angle $\theta t$.

In the present embodiment, the rudder angle of the travel device 10 is changeable within the range of $-90$ degrees to $+90$ degrees with respect to the longitudinal direction of the tunnel unit 5. However, in a case where the rudder angle of the travel device 10 is set to be changeable within a wider range, for example, within the range of $-180$ degrees to $+180$ degrees with respect to the longitudinal direction of the tunnel unit 5, the angle range $\theta a$ is greater than the determination reference angle $\theta t$ and less than $\theta t+180$ degrees. In this case, the angle range $\theta b$ is not less than $-90$ degrees and not greater than the determination reference angle $\theta t$.

As described above, the angle range $\theta a$ may be a variable range that is varied in accordance with the range within which the rudder angle of the travel device 10 is changeable. Information about the range within which the rudder angle of the travel device 10 is changeable is one example of restricting condition information. Another example of the restricting condition information may be information about a range to be excluded so as to, for example, make it more certain that the docking is performed by forward docking. For example, the restricting condition information may include the range of $-90$ degrees to $+90$ degrees as information about the range within which the rudder angle of the travel device 10 is changeable, and also include, as information about a range to be excluded, for example, information that the upper limit and the lower limit of the angle range $\theta a$ are each narrowed inward by a predetermined angle. In this case, if the predetermined angle is set to, for example, 2 degrees, the angle range $\theta a$ is greater than $(\theta t+2)$ degrees and not greater than $(180-2)$ degrees.

In a case where the restricting condition information does not include the information about the range within which the rudder angle of the travel device 10 is changeable, and is the information about a range to be excluded, if the predetermined angle is set to, for example, two degrees as described above, then the angle range $\theta a$ is greater than $(\theta t+2)$ and less than $(\theta t+180-2)$ degrees. Also, depending on, for example, the positional relationship between the passenger boarding bridge 1 and the aircraft 3 (see FIG. 4 and FIG. 5, for example), the information about a range to be excluded may be, for example, information that only the upper limit, or only the lower limit, of the angle range $\theta a$ is narrowed inward by a predetermined angle.

The restricting condition information may include information that there is no restricting condition. In a case where there is no restricting condition, the angle range $\theta a$ is greater than the determination reference angle $\theta t$ and less than $\theta t+180$ degrees. That is, in a case where the forward travel direction angle $\theta w$ is within this range, when the travel wheels 9 travel forward, the travel wheels 9 come closer to the fuselage guide line AL. The angle range $\theta a$ in the case where there is no restricting condition is the same range as that in the above-described case where the rudder angle of the travel device 10 is set to be changeable within the range of $-180$ degrees to $+180$ degrees. The rudder angle in this case is not a restricting condition.

Thus, in the case of the first example, the angle range $\theta a$ is set (calculated) based on the current determination reference angle $\theta t$ and the restricting condition information. It should be noted that the restricting condition information is prestored in the storage unit of the controller 50. In the case of the angle range $\theta a$ shown in FIG. 4, the restricting condition information is information that the range within which the rudder angle of the travel device 10 is changeable is the range of $-90$ degrees to $+90$ degrees with respect to the longitudinal direction of the tunnel unit 5.

As shown in FIG. 4, at a point when the cab 6 is docked with the aircraft 3, if the forward travel direction F of the travel wheels 9 is a direction within the forward-only travel docking enabling range (in other words, if the forward travel direction angle $\theta w$ of the travel wheels 9 is an angle within the angle range $\theta a$), it means that the cab 6 is docked with the aircraft 3 by forward travel of the travel wheels 9.

The present embodiment is intended to, at the time of docking the cab 6 with the aircraft 3, avoid a situation where the cab 6 is docked with the aircraft 3 by backward travel of the travel wheels 9 (the travel device 10). In this respect, for example, during a period from when the cab 6 starts being moved from the standby position until the cab 6 is docked with the aircraft 3, by maintaining a state where the forward travel direction F of the travel wheels 9 is a direction within the forward-only travel docking enabling range, the cab 6 can be docked with the aircraft 3 by forward travel of the travel wheels 9. That is, in the case of docking the cab 6 with the aircraft 3 while maintaining a state where the forward travel direction angle $\theta w$ of the travel wheels 9 is an angle within the angle range $\theta a$, the cab 6 is docked with the aircraft 3 by forward travel of the travel wheels 9, i.e., docking of the cab 6 with the aircraft 3 by backward travel of the travel wheels 9 can be avoided.

On the other hand, in the case of docking the cab 6 with the aircraft 3 in a state where the forward travel direction F of the travel wheels 9 is a direction outside the forward-only travel docking enabling range, the cab 6 is docked with the aircraft 3 by backward travel of the travel wheels 9. That is, in the case of docking the cab 6 with the aircraft 3 in a state where the forward travel direction angle $\theta w$ of the travel wheels 9 is an angle within the angle range $\theta b$, the cab 6 is docked with the aircraft 3 by backward travel of the travel wheels 9.

Forward Docking Determination Process of Second Example

In the forward docking determination process of the second example, a determination reference angle $\theta t1$ is used instead of the determination reference angle θt in the first example. The determination reference angle θt1 is an angle that is formed by the aircraft axis line BL of the aircraft 3 and calculated counterclockwise with respect to the tunnel orthogonal line Edv. In this case, when the aircraft 3 is stopped not at the regular stop position, but at such a position that the aircraft axis line BL of the aircraft 3 crosses the fuselage guide line AL, the determination reference angle θt1, which is more useful for performing the forward docking determination process than the determination reference angle θt, can be calculated.

In the forward docking determination process of the second example, the determiner 51 determines whether or not the forward travel direction F of the travel wheels 9 is a direction within the forward-only travel docking enabling range based on whether or not the current forward travel direction angle θw of the travel wheels 9 is an angle within the angle range θa, which is a range set based on the current determination reference angle θt1 and restricting condition information. In this case, a "direction within the forward-only travel docking enabling range" is a direction in which when the travel wheels 9 travel forward, in a plan view, the travel wheels 9 come closer to the aircraft axis line BL of the aircraft 3.

The determination reference angle θt1 can be calculated by using an equation shown below.

$$θt1=90-(α-γ1)=90-α+γ1$$

In the above equation, γ1 is an angle that is formed by the aircraft axis line BL of the aircraft 3 and that is calculated counterclockwise with respect to the X-axis. For example, the controller 50 may receive an actual stop position of and aircraft type information about the aircraft 3 from an external device that has a function of measuring the actual stop position of the aircraft 3, and may calculate the angle γ1 by additionally using these received information. The external device may be, for example, VDGS (Visual Docking Guidance System).

As one variation of the second example, an absolute value β of a maximum shift angle of the aircraft axis line BL of the aircraft 3 with respect to the fuselage guide line AL (i.e., an absolute value β of a crossing angle; β is an expected value) may be set in advance, and a determination reference angle θt1a may be calculated by using an equation shown below.

$$θt1a=90-\{α-(γ+β)\}=90-α+γ+β$$

In this case, since the angle γ formed by the fuselage guide line AL with respect to the X-axis, and the absolute value β of the maximum shift angle, are each prestored in the controller 50 as a predetermined value, the determination reference angle θt1a can be readily calculated.

Forward Docking Determination Process of Third Example

In the forward docking determination process of the third example, a determination reference angle θt2 is used instead of the determination reference angle θt in the first example. The determination reference angle θt2 is an angle that is formed by the tangent line TL touching the cab 6-docked part of the aircraft 3 and that is calculated counterclockwise with respect to the tunnel orthogonal line Edv. In this case, when the tangent line TL touching the cab 6-docked part of the aircraft 3 is not parallel to the aircraft axis line BL of the aircraft 3, the determination reference angle θt2, which is more useful for performing the forward docking determination process than the determination reference angles θt and θt1, can be calculated.

Accordingly, in the forward docking determination process of the third example, the determiner 51 determines whether or not the forward travel direction F of the travel wheels 9 is a direction within the forward-only travel docking enabling range based on whether or not the current forward travel direction angle θw of the travel wheels 9 is an angle within the angle range θa, which is a range set based on the current determination reference angle θt2 and restricting condition information. In this case, a "direction within the forward-only travel docking enabling range" is a direction in which when the travel wheels 9 travel forward, in a plan view, the travel wheels 9 come closer to the tangent line TL touching the cab 6-docked part of the aircraft 3.

The determination reference angle θt2 can be calculated by using an equation shown below.

$$θt2=90-(α-γ2)=90-α+γ2$$

In the above equation, γ2 is an angle that is formed by the tangent line TL touching the cab 6-docked part of the aircraft 3 and that is calculated counterclockwise with respect to the X-axis. For example, the controller 50 may receive an actual stop position of and aircraft type information about the aircraft 3 from an external device that has a function of measuring the actual stop position of the aircraft 3 (e.g., the aforementioned VDGS), and may calculate the angle γ2 by additionally using these received information.

Alternatively, the angle γ2 may be calculated in the following manner. For example, an angle formed by the tangent line TL touching the cab 6-docked part of the aircraft 3 and a straight line DL (see FIG. 1) extending along a distal end edge 6a of the cab 6 is calculated based on distances detected by the respective two distance sensors 23 (see FIGS. 2 and 3) and a distance (a predetermined value) between these two distance sensors 23, each of which detects the distance between the cab 6 and the aircraft 3. Then, the angle γ2 can be calculated based on this calculated angle, a rotational angle of the cab 6 with respect to the center line Ed of the tunnel unit 5, the rotational angle being detected by the cab angle sensor 25 (see FIG. 3), and an angle α. It should be noted that the rotational angle of the cab 6 is detected as an angle formed by the center line Ed of the tunnel unit 5 and a straight line that is orthogonal to the straight line DL extending along the distal end edge 6a of the cab 6.

In the case of the first example, the determination reference angle θt can be calculated in a simple manner. However, the aircraft 3 does not necessarily come to a stop in such a manner that the aircraft axis thereof is positioned straight above the fuselage guide line AL. Therefore, in such a case, by adopting the second example, the determination reference angle θt1, which is more useful than the determination reference angle θt of the first example, can be calculated. Further, in the case of the third example, the determination reference angle θt2, which is more useful than the determination reference angles θt and θt1 of the first and second examples, can be calculated. The third example is advantageous, for example, particularly in a case where the tangent line TL1, which touches the cab 6-docked part of the aircraft 3, is not parallel to the aircraft axis line BL of the aircraft 3.

Figure 5:
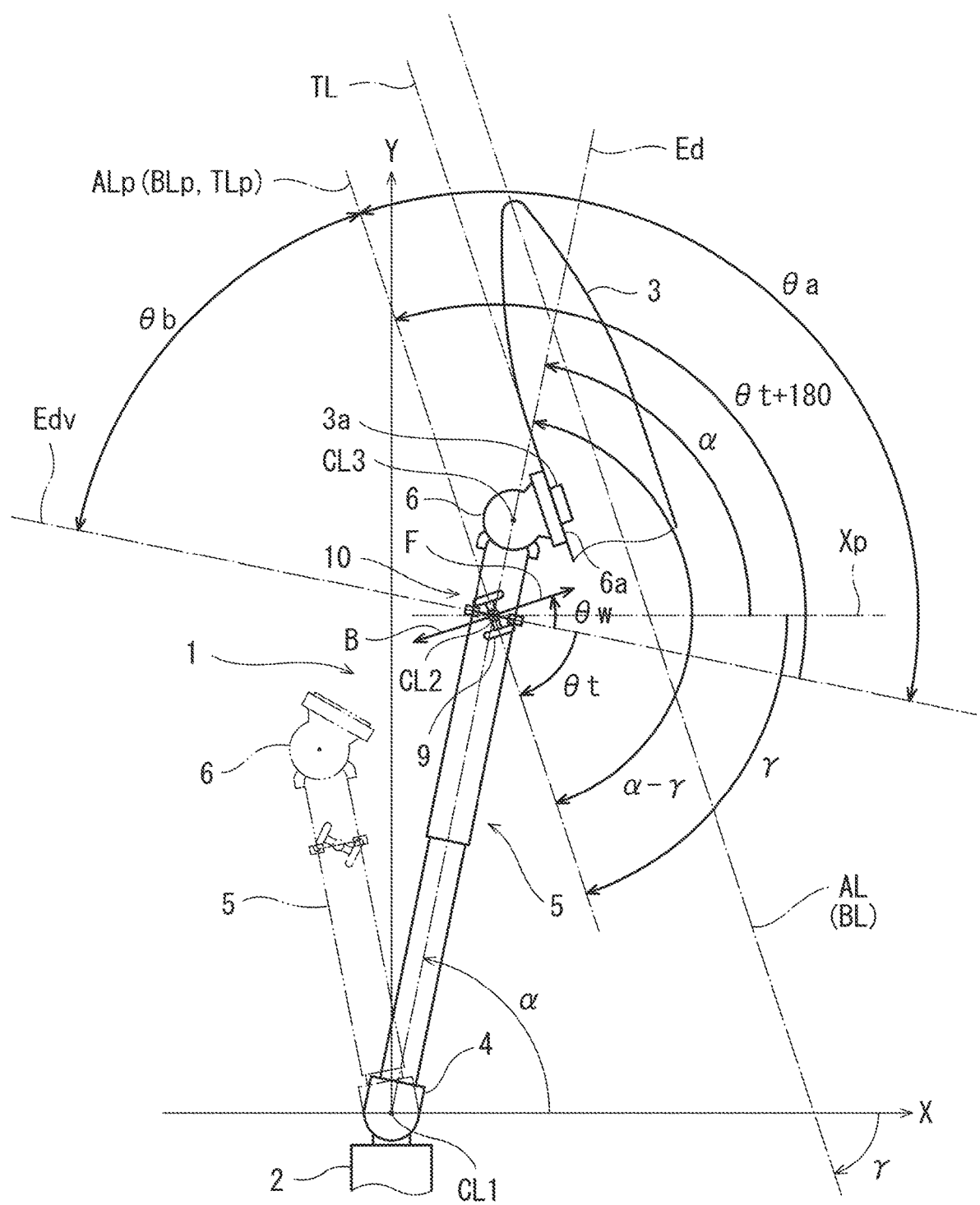
FIG. 5 is a schematic plan view showing another example where the passenger boarding bridge is in the state of being docked with the aircraft.

FIG. 5 is a schematic plan view showing another example where the passenger boarding bridge is in the state of being docked with the aircraft. FIG. 5 shows a case where the passenger boarding bridge 1 and the aircraft 3 are arranged differently from the cases of FIGS. 1 and 4. It should be noted that FIG. 5 is illustrated in a similar manner to FIG.

4, and the same elements as those of FIG. 4 are denoted by the same reference signs as those used in FIG. 4.

Also in the case of FIG. 5, the forward docking determination processes of the above-described first to third examples are the same as those described for the case of FIG. 4.

In the above first example, the angle γ has been described an angle that is formed by the fuselage guide line AL and that is calculated counterclockwise with respect to the X-axis. To be exact, the angle γ is, in a plan view, an angle that is formed by the X-axis positive direction and a direction from the front to the back of the aircraft 3 along the fuselage guide line AL, the angle being calculated with respect to the X-axis while defining the counterclockwise direction as the positive direction. The angle γ is set such that the absolute value thereof is within the range of 0 to 180 degrees. Accordingly, the angle γ shown in FIG. 5 is a negative value.

The angle θt has been described as an angle formed by the tunnel orthogonal line Edv and the fuselage guide line AL. To be exact, the angle θt is, in a plan view, an angle formed by the direction from the left side to the right side of the tunnel unit 5 along the tunnel orthogonal line Edv and the direction from the front to the back of the aircraft 3 along the fuselage guide line AL, the angle being calculated with respect to the tunnel orthogonal line Edv while defining the counterclockwise direction as the positive direction. The angle θt is set such that the absolute value thereof is within the range of 0 to 180 degrees. Accordingly, the angle θt shown in FIG. 5 is a negative value.

Also in FIG. 5, similar to FIG. 4, in the case of docking the cab 6 with the aircraft 3 in a state where the forward travel direction angle θw of the travel wheels 9 is an angle within the angle range θa, the cab 6 is docked with the aircraft 3 by forward travel of the travel wheels 9. In the case of FIG. 5, assuming that the rudder angle of the travel device 10 is changeable within the range of −90 degrees to +90 degrees with respect to the longitudinal direction of the tunnel unit 5, and this range within which the rudder angle of the travel device 10 is changeable is the only restricting condition information, then the angle range θa is not less than 0 degrees and less than θt+180 degrees. Similar to the case of FIG. 4, if there is no restricting condition, the angle range θa is greater than the determination reference angle θt and less than θt+180 degrees. In a case where the forward travel direction angle θw is within this range, when the travel wheels 9 travel forward, the travel wheels 9 come closer to the fuselage guide line AL.

In the case of docking the cab 6 with the aircraft 3 in a state where the forward travel direction angle θw of the travel wheels 9 is an angle within the angle range θb, the cab 6 is docked with the aircraft 3 by backward travel of the travel wheels 9. In the case of FIG. 5, the angle range θb is not less than θt+180 degrees and not greater than 180 degrees.

In the present embodiment, the rudder angle of the travel device 10 is changeable within the range of −90 degrees to +90 degrees with respect to the longitudinal direction of the tunnel unit 5. However, if the rudder angle of the travel device 10 is set to be changeable within a wider range, for example, within the range of −180 degrees to +180 degrees with respect to the longitudinal direction of the tunnel unit 5, then in the case of FIG. 5, similar to the case of FIG. 4, the angle range θa is greater than the determination reference angle θt and less than θt+180 degrees. Meanwhile, the angle range θb is not less than θt+180 degrees and not greater than 270 degrees.

In the second example, the angle γ1 is, to be exact, in a plan view, an angle formed by the X-axis positive direction and a direction from the front to the back of the aircraft 3 along the aircraft axis line BL of the aircraft 3, the angle being calculated with respect to the X-axis while defining the counterclockwise direction as the positive direction. The angle γ1 is set such that the absolute value thereof is within the range of 0 to 180 degrees.

The angle θt1 is, to be exact, in a plan view, an angle formed by the direction from the left side to the right side of the tunnel unit 5 along the tunnel orthogonal line Edv and the direction from the front to the back of the aircraft 3 along the aircraft axis line BL of the aircraft 3, the angle being calculated with respect to the tunnel orthogonal line Edv while defining the counterclockwise direction as the positive direction. The angle θt1 is set such that the absolute value thereof is within the range of 0 to 180 degrees.

In the third example, the angle γ2 is, to be exact, in a plan view, an angle formed by the X-axis positive direction and a direction from the front to the back of the aircraft 3 along the tangent line TL touching the cab 6-docked part of the aircraft 3, the angle being calculated with respect to the X-axis while defining the counterclockwise direction as the positive direction. The angle γ2 is set such that the absolute value thereof is within the range of 0 to 180 degrees.

The angle θt2 is, to be exact, in a plan view, an angle formed by the direction from the left side to the right side of the tunnel unit 5 along the tunnel orthogonal line Edv and the direction from the front to the back of the aircraft 3 along the tangent line TL touching the cab 6-docked part of the aircraft 3, the angle being calculated with respect to the tunnel orthogonal line Edv while defining the counterclockwise direction as the positive direction. The angle θt2 is set such that the absolute value thereof is within the range of 0 to 180 degrees.

First Operation Example

Figure 6:
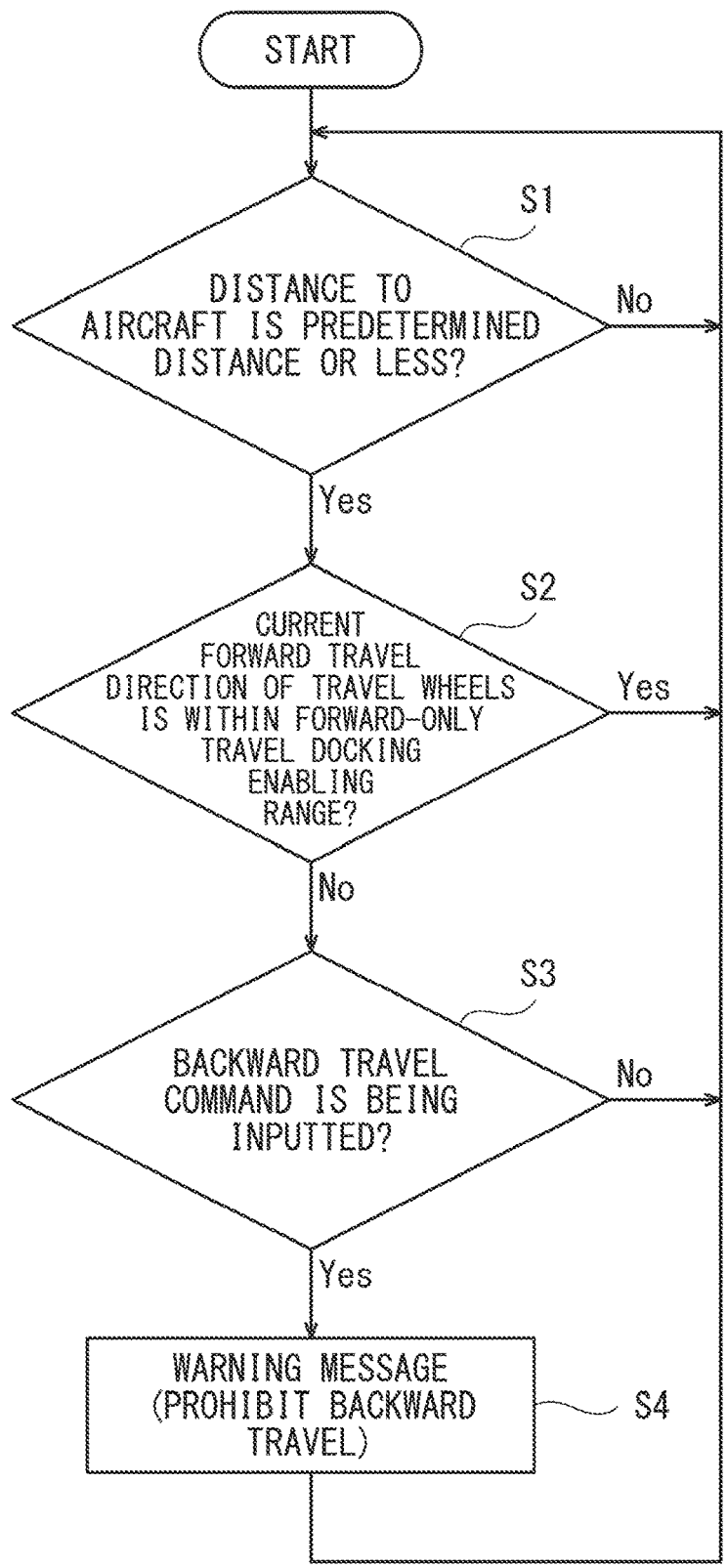
FIG. 6 is a flowchart showing one example of steps that a controller carries out when performing a forward docking determination process and its related processes in a first operation example.

FIG. 6 is a flowchart showing one example of steps that the controller 50 carries out when performing the forward docking determination process and its related processes at the time of docking the passenger boarding bridge 1 with the aircraft 3 in the first operation example. The processes shown in this flowchart are performed from when the passenger boarding bridge 1 (the cab 6) starts being moved from the standby position until the passenger boarding bridge 1 (the cab 6) is docked with the aircraft 3. It should be noted that the processes shown in this flowchart may be performed through the entire period from when the passenger boarding bridge 1 starts being moved from the standby position until it is docked with the aircraft 3. Alternatively, the processes shown in this flowchart may be performed in the second half of the period from when the passenger boarding bridge 1 starts being moved from the standby position until it is docked with the aircraft 3. For example, the "second half of the period" may start when a predetermined time has elapsed after the start of the moving of the cab 6 from the standby position, and may end when the docking of the cab 6 with the aircraft 3 is completed. Alternatively, assume a case where after the start of the moving of the cab 6 from the standby position until the cab 6 is docked with the aircraft 3, the cab 6 is operated by automatic control during the first half of the moving and the cab 6 is operated by manual control during the second half of the moving, the manual control being performed through operations by an operator. In this case, the "second half of the period" may be a period in which the cab 6 is operated by the manual control.

When the operator uses the operating device 30 of the control panel 31 to start an operation for causing the passenger boarding bridge 1 standing by at the standby position to move from the standby position in order to dock the cab 6 with the aircraft 3, the controller 50 determines whether or not the distance between the cab 6 (the distal end part of the cab 6) and the aircraft 3 is a predetermined distance or less (e.g., 1 m or less) (step S1).

In step S1, the controller 50 obtains the distance between the cab 6 and the aircraft 3, for example, based on values detected by the respective two distance sensors 23 provided on the distal end of the cab 6. In this case, an average of the distances detected by the respective two distance sensors 23 may be obtained as the distance between the cab 6 and the aircraft 3, or a smaller one of the distances detected by the respective two distance sensors 23 may be obtained as the distance between the cab 6 and the aircraft 3. The distal end of the cab 6 may be provided with another sensor. This sensor may detect that the distance from the sensor to the forward physical object (i.e., the aircraft 3) has become the aforementioned predetermined distance (e.g., a distance-settable photoelectric sensor). Based on an output signal from the sensor, the controller 50 may determine whether or not the distance between the cab 6 and the aircraft 3 is the predetermined distance or less.

If it is determined that the distance between the cab 6 and the aircraft 3 is the predetermined distance or less (Yes in step S1), the controller 50 performs the above-described forward docking determination process. If the result of the forward docking determination process indicates that the current forward travel direction F of the travel wheels 9 is a direction within the forward-only travel docking enabling range (Yes in step S2), the flow returns to step S1 to repeat the processing. The forward docking determination process performed in step S2 may be any one of the above-described first to third examples.

On the other hand, if the result of the forward docking determination process indicates that the current forward travel direction F of the travel wheels 9 is not a direction within the forward-only travel docking enabling range (No in step S2), i.e., is a direction outside the forward-only travel docking enabling range, the controller 50 determines whether or not a backward travel command is being inputted from the operating device 30 (step S3). If no backward travel command is being inputted (No in step S3), the flow returns to step S1 to repeat the processing.

On the other hand, if a backward travel command is being inputted from the operating device 30 (Yes in step S3), the controller 50 causes the display device 34 of the control panel 31 to display a warning message, and invalidates the backward travel command to prohibit backward travel (step S4). The warning message may be a message informing that backward travel or backward docking is not to be performed, for example, "Backward travel is not allowed." or "Backward docking is not allowed." Such a warning message may be outputted as an audio message from a speaker (not shown) provided on, for example, the control panel 31. At the time, a warning sound may be outputted by a buzzer (not shown) provided on, for example, the control panel 31. In this case, the operator either performs an operation of causing the travel wheels 9 to travel forward, or performs an operation of rotating the travel wheels 9 on the spot and then causing the travel wheels 9 to travel forward such that the forward travel direction F of the travel wheels 9 is a direction within the forward-only travel docking enabling range.

By performing the process of step S4, docking of the cab 6 with the aircraft 3 by backward travel of the travel wheels 9 can be avoided.

In FIG. 6, after it is determined "Yes" in step S1, when it is determined "No" in step S2, a warning may be given by using, for example, the above-described warning message. The order of these steps S1 and S2 may be reversed. However, the amount of operational processing is less in step S1 than in step S2. Accordingly, the operational processing load is less in the case of setting the processing flow such that the process of step S2 is performed after it is determined Yes in step S1.

The process of step S1 may be eliminated. However, as described in the above operation example, if the backward travel is restricted as in step S4 in a case where the distance between the cab 6 and the aircraft 3 is the predetermined distance or less and the forward travel direction F of the travel wheels 9 is not a direction within the forward-only travel docking enabling range, it is easier for the operator to operate the passenger boarding bridge 1. In the case of eliminating the process of step S1, then in step S4, only a warning may be given by outputting, for example, a warning message.

In a case where the forward travel direction F of the travel wheels 9 is not a direction within the forward-only travel docking enabling range when the distance between the cab 6 and the aircraft 3 is greater than the predetermined distance, only a warning may be given by outputting, for example, a warning message. Then, in a case where the distance between the cab 6 and the aircraft 3 has become the predetermined distance or less and the forward travel direction F of the travel wheels 9 is not a direction within the forward-only travel docking enabling range, the warning and the backward travel restriction may be performed as in step S4.

Second Operation Example

Figure 7:
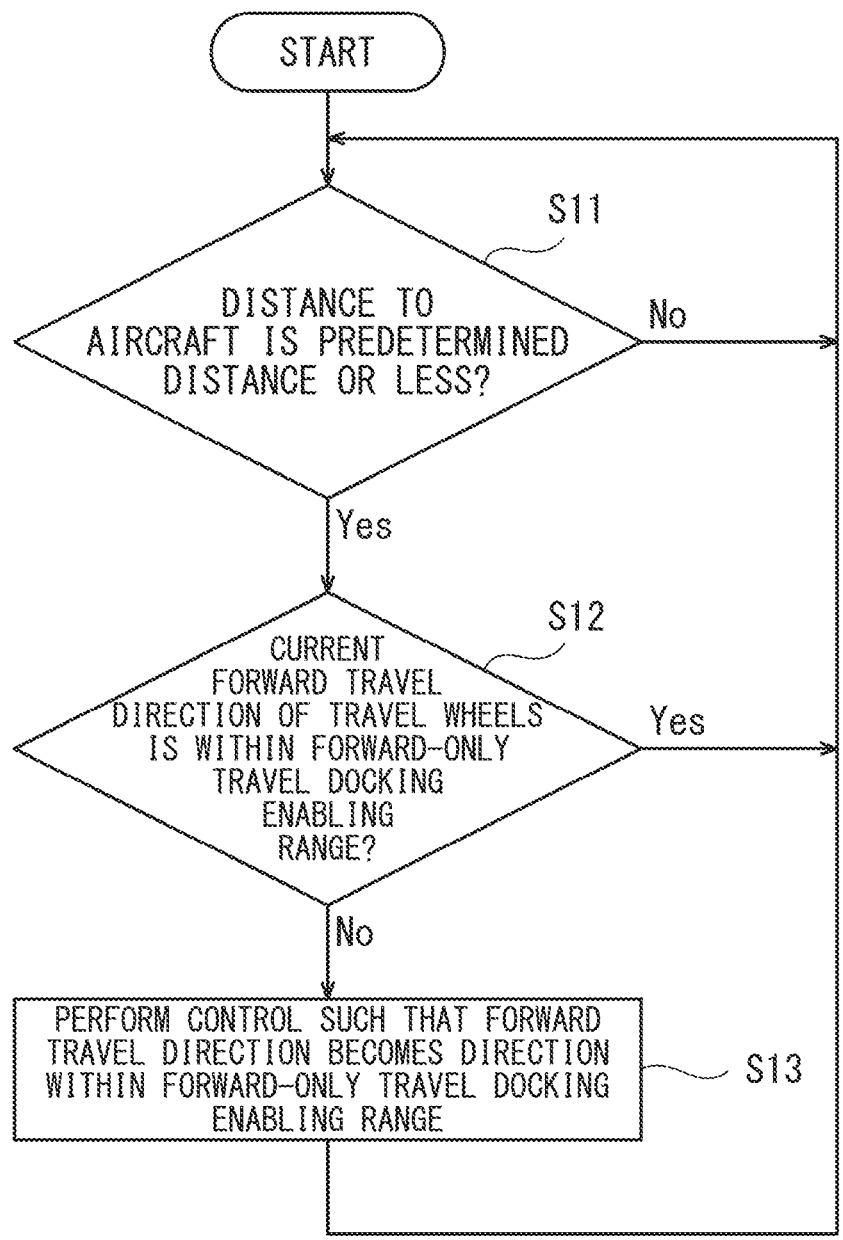
FIG. 7 is a flowchart showing one example of steps that the controller carries out when performing the forward docking determination process and its related processes in a second operation example.

FIG. 7 is a flowchart showing one example of steps that the controller 50 carries out when performing the forward docking determination process and its related processes at the time of docking the passenger boarding bridge 1 with the aircraft 3 in the second operation example. The processes shown in this flowchart are performed from when the passenger boarding bridge 1 (the cab 6) starts being moved from the standby position until the passenger boarding bridge 1 (the cab 6) is docked with the aircraft 3. It should be noted that the processes shown in this flowchart may be performed through the entire period from when the passenger boarding bridge 1 starts being moved from the standby position until it is docked with the aircraft 3. Alternatively, the processes shown in this flowchart may be performed in the second half of the period from when the passenger boarding bridge 1 starts being moved from the standby position until it is docked with the aircraft 3. For example, the "second half of the period" may start when a predetermined time has elapsed after the start of the moving of the cab 6 from the standby position, and may end when the docking of the cab 6 with the aircraft 3 is completed. Alternatively, assume a case where after the start of the moving of the cab 6 from the standby position until the cab 6 is docked with the aircraft 3, the cab 6 is operated by automatic control during the first half of the moving and the cab 6 is operated by manual control during the second half of the moving, the manual control being performed through operations by an operator. In this case, the "second half of the period" may be a period in which the cab 6 is operated by the manual control.

Steps S11 and S12 are the same as steps S1 and S2 of FIG. 6. In a case where the distance between the cab 6 and the aircraft 3 is the predetermined distance or less (Yes in step S11) and the forward travel direction F of the travel wheels 9 is not a direction within the forward-only travel docking enabling range (No in step S12), the controller 50 performs the process of step S13.

In step S13, the controller 50 controls the travel device 10 such that the forward travel direction F of the travel wheels 9 becomes a direction within the forward-only travel docking enabling range. For example, the two travel wheels 9 are rotated in opposite directions to each other such that the forward travel direction F of the travel wheels 9 becomes a direction within the forward-only travel docking enabling range.

Accordingly, even if the forward travel direction F of the travel wheels 9 becomes a direction outside the forward-only travel docking enabling range, the forward travel direction F of the travel wheels 9 is immediately brought back to be within the forward-only travel docking enabling range. In this manner, docking of the cab 6 with the aircraft 3 by backward travel of the travel wheels 9 can be avoided.

It should be noted that the process of step S3 of FIG. 6 may be performed between steps S12 and S13. In this case, if the forward travel direction F of the travel wheels 9 is not a direction within the forward-only travel docking enabling range in step S12 (No in step S12), i.e., is a direction outside the forward-only travel docking enabling range, it is determined whether or not a backward travel command is being inputted from the operating device 30 (step S3). If no backward travel command is being inputted (No in step S3), the flow returns to step S11 to repeat the processing, whereas if a backward travel command is being inputted (Yes in step S3), the process of step S13 is performed.

The process of step S11 may be eliminated. However, as described in the above operation example, if the forward travel direction F of the travel wheels 9 is controlled as in step S13 in a case where the distance between the cab 6 and the aircraft 3 is the predetermined distance or less and the forward travel direction F of the travel wheels 9 is not a direction within the forward-only travel docking enabling range, it is easier for the operator to operate the passenger boarding bridge 1.

From the foregoing description, numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the scope of the present invention.

INDUSTRIAL APPLICABILITY

The present invention is useful, for example, as a passenger boarding bridge capable of avoiding a situation where a cab thereof is docked with an aircraft by backward travel of travel wheels.

REFERENCE CHARACTERS LIST 1 passenger boarding bridge
2 terminal building
3 aircraft
4 rotunda
5 tunnel unit
6 cab
8 lifting/lowering device
9, 9L, 9R travel wheel
10 travel device
30 operating device
50 controller
51 determiner
AL fuselage guide line

The invention claimed is:

1. A passenger boarding bridge comprising:
a rotunda connected to a terminal building;
a tunnel unit whose proximal end is connected to the rotunda, the tunnel unit being extendable and retractable, the tunnel unit being rotatable about the rotunda;
a cab provided at a distal end of the tunnel unit, the cab being configured to be docked with an aircraft;
a travel device that supports the tunnel unit and includes travel wheels configured to travel forward and backward, the travel device being configured such that a direction of forward travel of the travel wheels and a direction of backward travel of the travel wheels are changeable;
an operating device that is operated to input an operation command to the travel device; and
a determiner configured to repeatedly perform determination whether or not the current direction of the forward travel of the travel wheels is a direction within a forward-only travel docking enabling range during a period from when the cab starts being moved from a predetermined position until the cab is docked with the aircraft, the cab being moved through an operation of the operating device to cause the travel wheels to travel.

2. The passenger boarding bridge according to claim 1, wherein
in a case where,
in a plan view, an angle formed by a direction from a left side to a right side of the tunnel unit along a tunnel orthogonal line and the direction of the forward travel of the travel wheels, the tunnel orthogonal line being a straight line orthogonal to a center line of the tunnel unit, the angle being calculated with respect to the tunnel orthogonal line while defining a counterclockwise direction as a positive direction, is an angle θw, and
in the plan view, an angle formed by the direction from the left side to the right side of the tunnel unit along the tunnel orthogonal line and a direction from a front to a back of the aircraft along a fuselage guide line on an apron, the angle being calculated with respect to the tunnel orthogonal line while defining the counterclockwise direction as the positive direction, is an angle θt,
the determiner is configured to perform the determination whether or not the direction of the forward travel of the travel wheels is a direction within the forward-only travel docking enabling range based on whether or not the angle θw is an angle within a range that is set, based on restricting condition information, within a range that is greater than the angle θt and less than an angle obtained by adding 180 degrees to the angle θt.

3. The passenger boarding bridge according to claim 1, wherein
in a case where, in a plan view, an angle formed by a direction from a left side to a right side of the tunnel unit along a tunnel orthogonal line and the direction of the forward travel of the travel wheels, the tunnel orthogonal line being a straight line orthogonal to a center line of the tunnel unit, the angle being calculated with respect to the tunnel orthogonal line while defining a counterclockwise direction as a positive direction, is an angle θw, and in the plan view, an angle formed by the direction from the left side to the right side of the tunnel unit along the tunnel orthogonal line and a direction from a front to a back of the aircraft along an aircraft axis line of the aircraft, the angle being calculated with respect to the tunnel orthogonal line while defining the counterclockwise direction as the positive direction, is an angle θt1, the determiner is configured to perform the determination whether or not the direction of the forward travel of the travel wheels is a direction within the forward-only travel docking enabling range based on whether or not the angle θw is an angle within a range that is set, based on restricting condition information, within a range that is greater than the angle θt1 and less than an angle obtained by adding 180 degrees to the angle θt1.

4. The passenger boarding bridge according to claim 1, wherein in a case where, in a plan view, an angle formed by a direction from a left side to a right side of the tunnel unit along a tunnel orthogonal line and the direction of the forward travel of the travel wheels, the tunnel orthogonal line being a straight line orthogonal to a center line of the tunnel unit, the angle being calculated with respect to the tunnel orthogonal line while defining a counterclockwise direction as a positive direction, is an angle θw, and in the plan view, an angle formed by the direction from the left side to the right side of the tunnel unit along the tunnel orthogonal line and a direction from a front to a back of the aircraft along a tangent line, the tangent line extending horizontally and touching a cab-docked part of the aircraft, the angle being calculated with respect to the tunnel orthogonal line while defining the counterclockwise direction as the positive direction, is an angle θt2, the determiner is configured to perform the determination whether or not the direction of the forward travel of the travel wheels is a direction within the forward-only travel docking enabling range based on whether or not the angle θw is an angle within a range that is set, based on restricting condition information, within a range that is greater than the angle θt2 and less than an angle obtained by adding 180 degrees to the angle θt2.

5. The passenger boarding bridge according to claim 1, wherein a direction within the forward-only travel docking enabling range is defined as a direction in which when the travel wheels travel forward, in a plan view, the travel wheels come closer to one of a fuselage guide line on an apron, an aircraft axis line of the aircraft, or a tangent line extending horizontally and touching a cab-docked part of the aircraft.

6. The passenger boarding bridge according to claim 1, wherein the determiner is configured to perform the determination when a distance between the cab and the aircraft is a predetermined distance or less.

7. The passenger boarding bridge according to claim 1, further comprising a warning unit configured to perform warning if an operation command to cause the travel device to travel backward is inputted from the operating device in a case where a result of the determination performed by the determiner indicates that the current direction of the forward travel of the travel wheels is not a direction within the forward-only travel docking enabling range.

8. The passenger boarding bridge according to claim 1, wherein the passenger boarding bridge is configured to prohibit backward travel of the travel wheels if an operation command to cause the travel device to travel backward is inputted from the operating device in a case where a result of the determination performed by the determiner indicates that the current direction of the forward travel of the travel wheels is not a direction within the forward-only travel docking enabling range.

9. The passenger boarding bridge according to claim 1, further comprising a controller configured to, in a case where a result of the determination performed by the determiner indicates that the current direction of the forward travel of the travel wheels is not a direction within the forward-only travel docking enabling range, control the travel device such that the direction of the forward travel of the travel wheels becomes a direction within the forward-only travel docking enabling range.

10. The passenger boarding bridge according to claim 1, further comprising a controller configured to, if an operation command to cause the travel device to travel backward is inputted from the operating device in a case where a result of the determination performed by the determiner indicates that the current direction of the forward travel of the travel wheels is not a direction within the forward-only travel docking enabling range, control the travel device such that the direction of the forward travel of the travel wheels becomes a direction within the forward-only travel docking enabling range.

* * * * *